United States Patent
Kadel et al.

(10) Patent No.: US 7,558,603 B2
(45) Date of Patent: Jul. 7, 2009

(54) METHOD AND SYSTEM FOR PROVIDING INFORMATION AND FOR COMMUNICATION IN VEHICLES

(75) Inventors: Gerhard Kadel, Darmstadt (DE); Sven Hischke, Bad Homburg (DE)

(73) Assignee: Deutsche Telekom AG, Bonn (DE)

( * ) Notice: Subject to any disclaimer, the term of this patent is extended or adjusted under 35 U.S.C. 154(b) by 401 days.

(21) Appl. No.: 10/369,854

(22) Filed: Feb. 19, 2003

(65) Prior Publication Data

US 2003/0157975 A1    Aug. 21, 2003

(30) Foreign Application Priority Data

Feb. 19, 2002    (DE)    ................. 102 07 858

(51) Int. Cl.
   *H04M 1/00*    (2006.01)
(52) U.S. Cl. ................. 455/569.2; 455/431; 455/556.2; 455/575.9; 455/96; 725/76; 725/74; 370/332
(58) Field of Classification Search .............. 455/569.2, 455/431, 556.2, 41.1, 575.9, 96, 99, 354; 725/76, 74, 80, 81; 370/332, 252
See application file for complete search history.

(56) References Cited

U.S. PATENT DOCUMENTS

| | | | | |
|---|---|---|---|---|
| 5,535,430 A | * | 7/1996 | Aoki et al. | ................. 455/552.1 |
| 5,732,078 A | * | 3/1998 | Arango | ........................ 370/355 |
| 6,266,701 B1 | * | 7/2001 | Sridhar et al. | ................ 709/232 |
| 6,628,233 B2 | * | 9/2003 | Knockeart et al. | ........ 342/357.1 |
| 6,639,550 B2 | * | 10/2003 | Knockeart et al. | ...... 342/357.13 |
| 6,664,924 B2 | * | 12/2003 | Knockeart et al. | ...... 342/357.13 |
| 6,665,729 B2 | * | 12/2003 | Walker | ........................ 709/237 |
| 6,680,694 B1 | * | 1/2004 | Knockeart et al. | ...... 342/357.09 |
| 6,697,415 B1 | * | 2/2004 | Mahany | ...................... 375/130 |
| 6,701,149 B1 | * | 3/2004 | Sen et al. | ...................... 455/436 |
| 6,791,959 B1 | * | 9/2004 | Palmer et al. | ................ 370/332 |
| 6,954,176 B2 | | 10/2005 | Bloecher | ...................... 342/374 |
| 2001/0029544 A1 | * | 10/2001 | Cousins | ........................ 709/233 |

(Continued)

FOREIGN PATENT DOCUMENTS

DE    195 31 415 C2    2/1997

(Continued)

OTHER PUBLICATIONS

Wiedemann, Helmut: "Fahrendes Kommunikationszentrum"; In: Auto & Elektronik, Jan. 2000, pp. 88-91 [See German Search Report of DE 102 07 858.0 and brief translation thereof].

(Continued)

*Primary Examiner*—Matthew D Anderson
*Assistant Examiner*—Minh D Dao
(74) *Attorney, Agent, or Firm*—Darby & Darby

(57) ABSTRACT

An information and communication system arranged in a vehicle permitting vehicle passengers to access locally held information and/or to use external applications and services includes a server. At least one transmitting and receiving unit connected to the server is provided and has access to at least one radio network. A plurality of access points are distributed in the vehicle and connected to the server. The passengers access applications or information or communicate with external partners or services via the system. The data exchange between the devices of the users and the system takes place with high bandwidth via the access points.

31 Claims, 1 Drawing Sheet

U.S. PATENT DOCUMENTS

| | | | |
|---|---|---|---|
| 2003/0103506 A1 | 6/2003 | Keller | 370/392 |
| 2003/0198184 A1* | 10/2003 | Huang et al. | 370/231 |
| 2005/0039208 A1* | 2/2005 | Veeck et al. | 725/76 |

FOREIGN PATENT DOCUMENTS

| | | |
|---|---|---|
| DE | 198 52 814 A1 | 6/1999 |
| DE | 199 01 136 A1 | 7/2000 |
| DE | 199 18 649 A1 | 10/2000 |
| DE | 100 24 007 A1 | 1/2001 |
| DE | 199 60 733 A1 | 9/2001 |
| DE | 100 12 080 C1 | 10/2001 |
| DE | 100 25 725 A1 | 12/2001 |
| GB | 23 22 262 A | 8/1998 |
| WO | WO 00 79727 A2 | 12/2000 |
| WO | 0177877 | 10/2001 |
| WO | 0197433 | 12/2001 |

OTHER PUBLICATIONS

Search Report for German Patent Application DE 102 07 858.0 [brief translation provided herewith].

* cited by examiner

METHOD AND SYSTEM FOR PROVIDING INFORMATION AND FOR COMMUNICATION IN VEHICLES

CROSS-REFERENCE TO RELATED APPLICATIONS

This application claims priority to German Patent Application No. 102 07 858.0, filed Feb. 19, 2002, which is hereby incorporated by reference as if set forth in its entirety.

BACKGROUND

The present invention relates to a method for providing information and for communication in vehicles, especially in larger public passenger transportation vehicles. The present invention also relates to a system for carrying out the method.

As the development toward the information society proceeds, a constantly increasing number of passengers of private or public vehicles (such as rail vehicles or busses) carry electronic data and communication devices such as laptops, PDAs, or mobile radio devices with them. Using these devices, they communicate with external communication partners or use the most different services. In this context, the possibility to access the Internet over mobile radio networks is also increasingly used. Due to the technology currently available for this purpose, there are a number of limitations and disadvantages for the user. Thus, first of all, it can be established that, in general, the data transfer rate is still comparatively low. Because of this, downloading of large files or the use of streaming applications, such as audio or video, are only possible with restrictions. In addition, sometimes, considerable costs are incurred to the user.

On the other hand, in many cases, the technical possibilities offered by the devices mentioned at the outset cannot be fully taken advantage of used when used in a vehicle. Many of the devices are already provided with air interfaces for local wireless networks (WLAN or Bluetooth) via which they can communicate with other devices. Currently, however, there are no comparable interfaces present inside vehicles such as busses or rail vehicles. With regard to communication with external communication partners it can also be established that radio reception or, in the case of transmission, the transmission power that reaches the outside are strongly impaired or reduced because of the shielding effect of the vehicles, which act as a Faraday cage, or also because of metallized window panes by additional attenuation. Due to all these disadvantages, extensive use of the content provided over the Internet or exchange of larger data volumes are, in principle, not possible or at least do not make sense economically.

SUMMARY OF THE INVENTION

An object of the present invention is to provide a method that allows vehicle passengers who carry corresponding electronic devices with them to access an extensive range of information, to use external services, and to exchange data with external communication partners at a high data rate and in an inexpensive manner. A further object is to provide a system that can be used to carry out the method.

The present invention provides a method for providing information and for communication in vehicles (1). According to the method, an information and communication system (2, 3, 3', 4, 4') which is arranged in a vehicle (1), preferably integrated into the vehicle (1), allows the passengers of the vehicle (1) to access local information provided by the system (2, 3, 3', 4, 4') itself and/or to use external applications and services (6). The vehicle passengers communicate with the system (2, 3, 3',4, 4'), which acts as a central platform for local applications and information sources and as a switching device to the external applications and services (6), using electronic data and communication devices (5, 5') such as laptops, PDAs, or mobile radio devices carried by them. The communication taking place wirelessly with high bandwidth vie system access points (3, 3') distributed in the vehicle (1).

According to the inventive method, an information and communication system arranged in a vehicle allows the passengers of the vehicle to access local information that is provided by the system itself and/or to use external applications and services. In this context, the vehicle passengers communicate with the system, which acts as a central platform for local applications and information sources and as a switching device to the external applications and services, using electronic data and communication devices such as laptops, PDAs, or mobile radio devices that they carry with them, that is, which are located in the vehicle. According to the present invention, this communication takes place wirelessly via system access points that are distributed in the vehicle. Thus, unlike in known systems, not every vehicle passenger accesses an external services or the like directly, but rather via the system according to the present invention, which is preferably integrated into the vehicle. In this context, the user profits from the performance of this system which makes available to the him/her high data rates which are not achievable in case of direct access using the electronic devices the user carries with him/her. Moreover, in many cases, it is actually not necessary for the user to access external services at all. Rather, a wealth of information, such as timetable data or news, but also entertainment choices, such as movies or games are held available at a local level. In this context, the system makes use of the fact that a large mass memory required for this purpose can be provided with much less technical effort in a system arranged in the vehicle than in a portable device. According to a particularly advantageous embodiment of the inventive method, the data exchange between the devices of the users and the access points distributed in the vehicle is accomplished using wireless broadband technologies, such as Wireless Local Area Networks (WLANs), Bluetooth, or HYPERLAN/2. This makes it possible, for example, to transmit streaming applications in high quality to a device of the user.

According to another particularly advantageous embodiment of the method, the information and applications held locally on the information and communication system is regularly updated at stopping points of the vehicle that are specifically designed for this purpose. Another embodiment of the method also provides the possibility of updating components of the software that controls the information and communication system. Expediently, this update is also carried out at the aforementioned, specially designed stopping points.

A system designed for carrying out the method includes a server located in the vehicle, at least one, preferably a plurality of transmitting and receiving units which are connected to the server and each have access to at least one external radio network, as well as a plurality of system access points which are distributed in the vehicle and also connected to the server. The access points each have an interface for wireless, preferably radio-based data exchange with the electronic data and communication devices carried by the vehicle passengers. In this context, the provision of the information retrieved by these devices and the use of external services or the communication with preferably external communication partners carried out using these devices are controlled by the software running on the server.

In an embodiment of the system according to the present invention, under coordination of the system software and using the transmitting and receiving units, each user is provided with online access to the Internet. According to this embodiment of the present invention, the data exchange is carried out in a very flexible manner depending on the requirements of a service used by a vehicle passenger and on the availability of the radio networks to which the transmitting and receiving units are logged on. This means that the data exchange takes place over radio networks, such as GSM, GPRS, UMTS, other mobile networks, dedicated networks, such as GSM-R, or satellite networks in an alternating manner, if necessary even during the use of the service. It is also conceivable to include digital broadcasting networks (e.g. DAB, DVB, DMB) or, possibly, dedicated networks based on broadcast technologies for coverage of a traffic network. Thus, in each case the best radio network is used to access the information. Possibly, moreover, individual applications run using different communication paths. Thus, for example, a short email is transmitted using a mobile network connection while web browsing is perhaps done via a broadcast medium, possibly even via a satellite connection. As far as the above talks about access to external services or the use thereof, this also includes, of course, the management of large outgoing data volumes which is intelligently coordinated by the system, for example, during the sending of emails. This system design, which allows a high degree of flexibility, is particularly convenient, especially with regard to the varying availability of the networks, for example, due to the shielding effect of buildings. Additional improvement is achieved by mounting the antennas of the transmitting and receiving units externally. In an embodiment, the external antennas are designed as an antenna array having a suitable signal processing (so-called "intelligent antenna").

In spite of all these measures, an interruption of the radio contact, which is possible for a variety of reasons, cannot completely be prevented, for example, when the vehicle travels through a long tunnel. In another embodiment of the system, the incoming data is buffered in the server and passed on to the user at a somewhat reduced data rate in order to make available the external services to the user of the system unimpaired by such interruptions. Such buffering is, of course, also carried out for outgoing data, if necessary. In this manner, possible radio interruptions can, as it were, be hidden from the user. An embodiment of the system according to the present invention provides the ability to update the data held on the system or the software components controlling the system. In another embodiment, the system is provided with at least one external interface for this purpose via which the update is loaded at specific stopping points of the vehicle.

BRIEF DESCRIPTION OF THE DRAWING

The present invention is elaborated upon below based on exemplary embodiments with reference to the drawing, in which.

DETAILED DESCRIPTION

Figure 1:
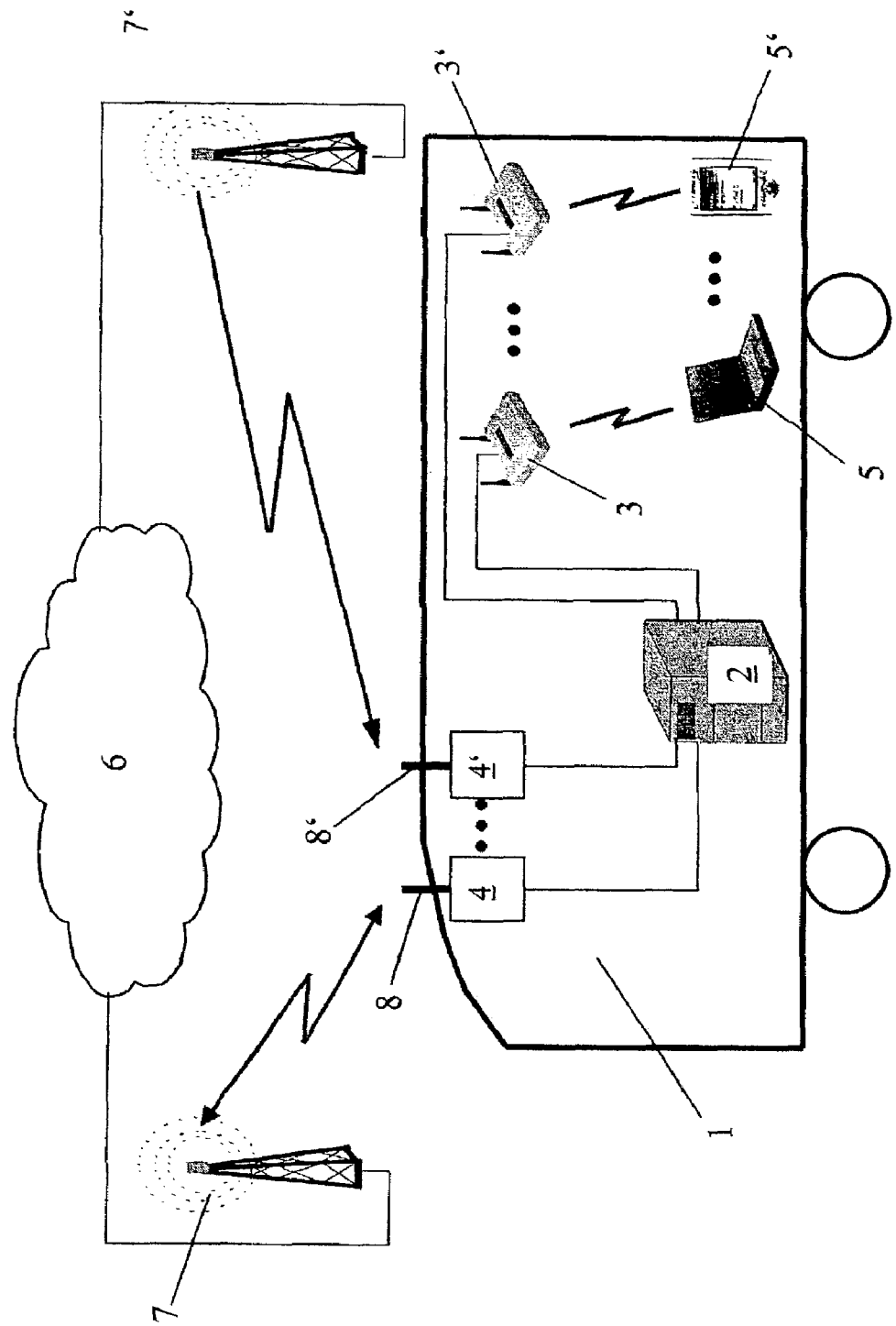
FIG. 1 is a schematic representation of a system for providing information and for communication in vehicles system according to an embodiment of the present invention.

As can be seen, important components of system 2, 3, 3', 4, 4' are located inside vehicle 1. System 2, 3, 3', 4, 4', which is shown, by way of example, in the drawing, includes a server 2, a plurality of transmitting and receiving units 4, 4' which are connected to the server and used for contact with external radio networks 7, 7', as well as access points 3, 3', which are also connected to the server and distributed in vehicle 1. The number of access points 3, 3' and the manner in which they are distributed depends, of course, on the type of vehicle 1 (bus, rail vehicle, or other). Using suitably equipped devices 5, 5', that is, laptops, PDAs, or mobile radio devices having, for example, a Bluetooth interface, the vehicle passengers can use this infrastructure. If a user queries an information item using a device 5, 5' carried by him/her through data exchange with an access point 3, 3', then server 2 of system 2, 3, 3', 4, 4' initially checks whether this information item is available within the scope of the applications and contents held locally on the correspondingly sized memory of server 2 (not shown in detail in FIG. 1). Only if this is not the case, system 2, 3, 3', 4, 4' establishes a connection to an external service 6. If vehicle 1 is, for example, a public transportation vehicle, in particular information on timetables, routes, or on the destinations where the vehicle stops are, preferably locally, held on server 2. In this context, it is irrelevant to the user from where he/she obtains the information. It is only important for the user to have fast and user-friendly access to the information. However, it he/she wishes to use web contents that are not present on the server or to communicate via email, this is possible in the same unrestricted manner. On the contrary, when using these services 6, he/she is even provided with increased convenience. First of all, shielding or attenuation problems, as are otherwise known to occur when using mobile radio devices in buses or rail vehicles, no longer occur when using system 2, 3, 3', 4, 4' according to the present invention; secondly, the performance of system 2, 3, 3', 4, 4', which is markedly increased compared to mobile devices 5, 5', has a beneficial effect for its users. This concerns in particular the download or upload of large data volumes. Via transmitting and receiving units 4, 4', which, as in the example, advantageously include external antennas 8, 8', radio connections with the external communication partners are established with very high data transfer rates. The received or transmitted data is buffered on the server and passed on to the respective user via access points 3, 3', which are distributed in vehicle 1, or, in the case of transmission, to the external receiver over the particular radio network used. This eliminates the need for the user to establish an expensive connection, which, using his/her device 5, 5', allows only a comparatively low data transfer rate, to external service 6. In order to connect to services 6, server 2 uses different radio networks 7, 7', depending on the requirements of the services and on the availability of radio networks 7, 7' in which transmitting and receiving devices 4, 4' of the system can operate. In the case of deteriorating reception conditions, the software running on server 2 for controlling system 2, 3, 3', 4, 4' even allows radio network 7, 7' to be changed during the use of a service 6 without thereby affecting the user. Thus, the different radio communications networks 7, 7' are basically interconnected by the control software of the information and communication system. Of course, this also allows the communication to be distributed among the different networks from the start, i.e., by default, depending on the requirements of the services and on the availability of the networks. Thus, for example, applications having a high downstream portion can be advantageously implemented over broadcasting networks (e.g., DAB).

Preferably, the applications and the data stored on server 2, possibly also the software components for system control, are updated cyclically or as needed. This is done with the aid of "radio bridges" based on WLAN technologies at stopping points of vehicle 1 (not shown in FIG. 1) that are specifically designed for this purpose. At these points then, for example, news contents are updated, new timetable and line data is transmitted, or new movies are loaded onto server 2.

In summary, the present invention yields numerous advantages for the user or for the vehicle passengers. Access to the services and applications that are available locally on server 2, such as entertainment choices, takes place at very high data rates. For online access to the Internet using mobile terminal devices that an interface for data transmission using broadband technologies (such as Bluetooth, WLAN, HYPERLAN/2) the availability is increased and, here too, downloading takes place at a much higher data rate than in the case of direct access, for example, from a mobile telephone because of the performance of the components of system 2, 3, 3', 4, 4'. As a consequence, besides improved convenience, this results in markedly reduced costs for the user.

In the preceding specification, the present invention has been described with reference to specific exemplary embodiments thereof. It will, however, be evident that various modifications and changes may be made thereto without departing from the broader spirit and scope of the invention as set forth in the claims that follow. The specification and drawings are accordingly to be regarded in an illustrative manner rather than a restrictive sense.

What is claimed is:

1. A method for providing information and for communication in a vehicle, comprising:
   providing an information and communication system in the vehicle, the system being configured to enable a passenger of the vehicle to access at least one of a local service provided by the system and an external service, the system serving as a central platform for the local service and as a switching device to the external service;
   communicating wirelessly with the system by the passenger using an electronic communication device via a system access point in the vehicle;
   buffering, using a server, data between the communication device and the external service and passing the buffered data at a reduced data rate so as to prevent interruptions in communications;
   updating the local service at an appropriately configured stopping point of the vehicle; and
   providing the passenger the access to the external service over a plurality of different external radio networks in an alternating manner.

2. The method as recited in claim 1 wherein the system is integrated into the vehicle.

3. The method as recited in claim 1 wherein the electronic communication device includes an electronic data device.

4. The method as recited in claim 1 wherein the electronic communication device includes at least one of a laptop, a PDA, and a mobile radio device carried by the passenger.

5. The method as recited in claim 1 wherein the communicating wirelessly is performed at high bandwidth.

6. The method as recited in claim 1 further comprising a plurality of additional system access points distributed in the vehicle.

7. The method as recited in claim 1 wherein the external service includes at least one of information and an application.

8. The method as recited in claim 1 wherein the local service includes at least one of information and an application.

9. The method as recited in claim 1 wherein the communicating wirelessly is performed using a wireless broadband technology including at least one of a Wireless Local Area Networks, Bluetooth, and HYPERLAN/2.

10. The method as recited in claim 1 wherein the information and communication system includes a software component and further comprising updating the software component at an appropriately configured stopping point of the vehicle.

11. The method as recited in claim 1 wherein the providing the access to the external service over the plurality of different external radio networks in the alternating manner is performed during a use by the passenger of the external service.

12. The method recited in claim 1, further comprising the steps of:
   establishing a high data transfer rate connection between the system and the external service;
   buffering data from the external service to the system;
   passing the buffered data to the electronic communication device at a transfer rate which is less than the high data transfer rate established between the system and the external service.

13. A system for providing a passenger of a vehicle access to at least one of a local service provided by the system and an external service, comprising:
   a server disposed on the vehicle and running a software;
   at least one transmitting and receiving unit connected to the server, each of the at least one transmitting and receiving unit capable of accessing at least one external radio network;
   a plurality of system access points distributed in the vehicle and connected to the server, each of the access points having an interface configured for wireless data exchange with an electronic data and communication device of the passenger so as to provide the at least one of the local and the external service under control of the software; and
   an external interface configured to update at least one of information of the system and the software;
   wherein the at least one external radio network includes a plurality of different radio networks and wherein the server, using the software, is configured to provide the access to the external service over the plurality of different external radio networks in an alternating manner and
   wherein the server is configured to buffer the electronic data between the communication device and the external service and pass the buffered data at a reduced data rate so as to prevent interruptions in communications.

14. The system as recited in claim 13 wherein the interface is configured for radio-based data exchange with the electronic data and communication device.

15. The system as recited in claim 13 wherein the electronic communication device includes at least one of a laptop, a PDA, and a mobile radio device carried by the passenger.

16. The system as recited in claim 13 wherein the external service provides communication with an external communication partner.

17. The system as recited in claim 13 wherein the external service includes at least one of information and an application.

18. The system as recited in claim 13 wherein the local service includes at least one of information and an application.

19. The system as recited in claim 13 wherein the external service includes online access to an internet, and wherein the server, using the software, and the at least one transmitting and receiving unit are configured to together provide the passenger the online access to the internet in a flexible manner over the external radio network.

20. The system as recited in claim 19 wherein the external radio network includes at least one of a mobile network (e.g. GSM), a GPRS network, a UMTS network, a satellite network, a broadcast network, and a dedicated network.

21. The system as recited in claim 20 wherein the dedicated network is a GSM-R network.

22. The system as recited in claim 20 wherein the server, using the software, and the at least one transmitting and receiving unit together are configured to together provide the passenger the online access to the internet over different networks of the external radio networks in an alternating manner.

23. The system as recited in claim 22 wherein the online access is provided over the different networks as a function of requirements of the external service and an availability of the respective radio network.

24. The system as recited in claim 13 wherein the transmitting and receiving unit includes an antenna disposed on an exterior of the vehicle.

25. The system as recited in claim 24 wherein the transmitting and receiving unit includes another antenna, the antenna and the another antenna forming an antenna array with integrated signal processing.

26. The system as recited in claim 13 wherein the server, using the software, is configured to provide the passenger access to the external service, over the plurality of different external radio networks in an alternating manner during a use by the passenger of the external service.

27. The system recited in claim 13, wherein the server is configured to establish a high data transfer rate connection between the system and the external service; buffer the electronic data between the external service and the server, and pass the buffered data to the communication device at a transfer rate less than that of the high data transfer rate.

28. A method for providing information and for communication in a vehicle, comprising:
   providing an information and communication system in the vehicle, the system being configured to enable a passenger of the vehicle to access at least one of a local service provided by the system and an external service, the system serving as a central platform for the local service and as a switching device to the external service, the system including a software component;
   communicating wirelessly with the system by the passenger using an electronic communication device via a system access point in the vehicle;
   providing the passenger access to the external service over a plurality of different external radio networks in an alternating manner;
   buffering, using a server, data between the communication device and the external service and passing the buffered data at a reduced data rate so as to prevent interruptions in communications; and
   updating the software component at an appropriately configured stopping point of the vehicle.

29. The method as recited in claim 28 wherein the external service includes at least one of information and an application.

30. The method as recited in claim 28 wherein the local service includes at least one of information and an application.

31. The method recited in claim 28, further comprising the steps of:
   establishing a high data transfer rate connection between the system and the external service;
   buffering data from the external service to the system;
   passing the buffered data to the electronic communication device at a transfer rate which is less than the high data transfer rate established between the system and the external service.

* * * * *